Patented Apr. 24, 1928.

1,667,686

UNITED STATES PATENT OFFICE.

WILLIAM BENIEN AND JAMES I. FLAHERTY, OF LINCOLN, KANSAS.

ANTISKID DEVICE FOR AUTOMOBILE WHEELS.

Application filed February 4, 1926. Serial No. 85,987.

This invention relates to anti-skid devices for automobile wheels of that type embodying cross or tread members and side or retaining members.

The invention has for one of its objects the provision of a novel and simple device of this character wherein the cross or tread members shall each consist of solid links, wherein the side or retaining members shall each consist of steel cables, and wherein the cross or tread members can be readily detached from the side or retaining members for the purpose of making repairs.

A further object of the invention is the provision of novel and simple means through the medium of which the ends of the side or retaining members may be readily connected together and which shall be adjustable to adapt the device for application to automobile wheels of different sizes.

With the foregoing and other objects in view, the invention consists of the novel construction, combination and arrangement of parts hereinafter fully described and claimed, and illustrated in the accompanying drawing, wherein:

Figure 1 is a view in side elevation of an automobile wheel equipped with an anti-skidding device embodying our invention, Figure 2 is a transverse sectional view taken on the plane indicated by the line 2—2 of Figure 1, Figure 3 is a detail perspective view of one of the terminal links of the cross or tread members of the anti-skid device, Figure 4 is a longitudinal sectional view illustrating the construction of the means or couplings for connecting the ends of the side or retaining members, and Figure 5 is a sectional view taken on the plane indicated by the line 5—5 of Figure 4.

Corresponding and like parts are referred to in the following description, and designated in the several views of the accompanying drawing, by similar reference characters.

In the drawing 1 designates an automobile wheel and 2 a pneumatic tire. The anti-skid device comprises cross or tread members 3, side or retaining members 4, and couplings 5 for the ends of the side or retaining members.

The cross or tread members 3 each consists of solid links 6, 7 and 8. The number of links in each cross or tread member 3 will depend upon the size of the tire to which the anti-skid device is to be applied. The links 6 are similar and are provided at their ends with apertured lugs or ears 6ª. The links 7 are similar and are provided at their ends with recesses 7ª for the reception of the ears 6ª. The links 8 are similar and are each provided in its outer end with recesses 8ª for the reception of the ears 6ª of certain of the links 6, and are provided adjacent their inner ends with openings 8ᵇ for the reception of the side or retaining members 4. The said other ends of the links 8 are slotted as at 8ᶜ to permit the side or retaining members 4 to be readily inserted in the openings 8ᵇ, and the slotted ends of these links are clamped together by bolts 9 to prevent the cross or tread members 3 from becoming accidentally detached from the side or retaining members 4 and to prevent the cross or tread members from having any circumferential movement on or with respect to the side or retaining members. The links 6, 7 and 8 are pivotally connected by rivets 10, and the ends of the links project, as shown at 11, beyond the body portion thereof so as to increase the tractive effect of the anti-skid device.

The side or retaining members 4 each consists of a single length of steel cable, and the couplings 5 therefor each comprises members 12 and 13. Each coupling member 12 consists of a body portion 12ª provided with inclined slots 12ᵇ opening out through an edge thereof, a shank 12ᶜ provided with an opening 12ᵈ, and split sleeves 12ᵉ located at opposite sides of the shank and at opposite sides of the opening. The ends of the side or retaining members 4 to which the coupling members 12 are secured extend through the openings 12ᵈ and sleeves 12ᵉ. The members 13 have U or channel shaped bodies 13ª, and each is provided with a shank 13ᵇ having an opening 13ᶜ and split sleeves 13ᵈ located at opposite sides of the shank and at opposite sides of the opening. These members are applied to the other ends of the side or retaining members 4, and said ends pass through the opening 13ᶜ and sleeves 13ᵈ. Due to the relative arrangement of the opening and sleeves of each coupling member, there is no possibility of such members becoming accidentally detached from the side or retaining members. The coupling members 13 receive the coupling members 12, the bodies 12ª of the latter being positioned in the bodies 13ª of the former. The coupling members 12 and 13 are connected together by cotter pins 14 which pass through certain of the openings 15 in the members, and cross pins 16 which are carried by the coupling members 13 and pass through certain of the slots 12ᵇ in the coupling members 12.

From the foregoing description, taken in connection with the accompanying drawing, it will be apparent that the anti-skid device can be easily and quickly applied to or removed from the tire of an automobile wheel, and that when the device is in applied position the members 3 will extend transversely across the tire and the members 4 lie at opposite sides of the tire. As the links 6, 7 and 8 are solid, and as the side or retaining members 4 are made of lengths of steel cables, the device is practically indestructible and will offer the greatest resistance to wear. The cross or tread members 3 may be readily connected to or disconnected from the side or retaining members 4, and due to the projecting ends 11 of the links 6, 7 and 8 the device has such tractive qualities as to prevent the wheel from slipping laterally or circumferentially. As the coupling members 12 are each provided with a number of slots 12ᵇ for the reception of the cross pins 16, the device is adapted to be applied to tires of different sizes.

It should be understood that the drawing is merely illustrative and does not pretend to give exact proportions. Furthermore, the said drawing is illustrative of a preferred construction, it being our expectation that various changes and modifications may be made without departing from the spirit and scope of our invention.

What is claimed is:—

1. In an anti-skid device, links for connecting the cross members of the device to the side members thereof and consisting of solid bodies provided in their outer ends with recesses for the reception of the terminals of the cross members, pivots connecting the links to the cross members, the links being provided adjacent their inner ends with openings for the reception of the side members and provided with slots extending from the openings to their inner ends to permit the side members to be inserted in the openings, the openings and slots being arranged in parallel relation to the pivots, and bolts passing through the links inwardly beyond the openings for clamping together those portions of the links located inwardly beyond the openings and at opposite sides of the slots.

2. In an anti-skid device, a coupling for a side member of the device and comprising an elongated member provided with inclined slots extending inwardly from an edge thereof, said coupling member being provided at one end with relatively offset side member receiving sleeves, a second elongated coupling member of U-form to receive said first coupling member and provided at one end thereof with relatively offset side member receiving sleeves, the ends of the coupling members provided with the sleeves being located at opposite ends of the coupling, and a pin passing through said second coupling member and one of the slots of said first coupling member.

In testimony whereof we affix our signatures.

WILLIAM BENIEN.
JAMES I. FLAHERTY.